(12) United States Patent
Tijssen

(10) Patent No.: US 8,329,269 B2
(45) Date of Patent: Dec. 11, 2012

(54) TUBULAR FILM FOR FOODSTUFF CASING AND A FOODSTUFF CASING PRODUCED FROM THE FILM

(75) Inventor: Pascal M. H. P. Tijssen, Beek (NL)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 13/264,005

(22) PCT Filed: Apr. 20, 2010

(86) PCT No.: PCT/EP2010/055154

§ 371 (c)(1),
(2), (4) Date: Jan. 13, 2012

(87) PCT Pub. No.: WO2010/122001

PCT Pub. Date: Oct. 28, 2010

(65) Prior Publication Data

US 2012/0121833 A1    May 17, 2012

(30) Foreign Application Priority Data

Apr. 20, 2009 (EP) .................................. 09158266
Jul. 13, 2009 (EP) .................................. 09165321
Nov. 18, 2009 (EP) .................................. 09176286

(51) Int. Cl.
*A22C 13/00* (2006.01)
*B29D 22/00* (2006.01)
*B29D 23/00* (2006.01)

(52) U.S. Cl. ..................... 428/34.8; 428/35.2; 428/35.7; 428/36.9; 428/36.92; 428/480

(58) Field of Classification Search ................ 428/34.8, 428/35.2, 35.7, 36.9, 36.92, 480
See application file for complete search history.

(56) References Cited

U.S. PATENT DOCUMENTS 2,384,462 A   9/1945   Goodman
4,123,589 A   10/1978  Korlatzki et al.
6,764,753 B2  7/2004   Schenck et al.

FOREIGN PATENT DOCUMENTS

DE          257 384        6/1988
WO   WO 2006/112753       10/2006

OTHER PUBLICATIONS

International Search Report for PCT/EP2010/055154, mailed Oct. 5, 2010.

*Primary Examiner* — Michael C Miggins
(74) *Attorney, Agent, or Firm* — Nixon & Vanderhye P.C.

(57) ABSTRACT

A tubular film for foodstuff casings, which film is produced from a polymer composition containing a thermoplastic polyester that has a complex shear viscosity $\eta^*$ of at least 3000 Pa·s measured ISO 6721-10:1999 at 240° C. and 0.1 rad/s. Also claimed is a foodstuff casing produced from the tubular film.

10 Claims, No Drawings

TUBULAR FILM FOR FOODSTUFF CASING AND A FOODSTUFF CASING PRODUCED FROM THE FILM

This application is the U.S. national phase of International Application No. PCT/EP2010/055154 filed 20 Apr. 2010 which designated the U.S. and claims priority to EP Patent Application Nos. 09158266.8 filed 20 Apr. 2009, 09165321.2 filed 13 Jul. 2009, and EP 09176286.4 filed 18 Nov. 2009, the entire contents of each of which are hereby incorporated by reference.

The invention relates to a tubular film for foodstuff casing and a foodstuff casing produced from the film.

Foodstuff casings, like for example sausage casings are made of natural material like for instance cellulose, collagen or animal guts or synthetic material. Synthetic materials are used as sausage casing for sausages that need not to be smoked. When smoked products are desired however normally natural materials are used. In this case the foodstuff is normally packed in the casing and further subjected to a smoking process. The product is suspended into a chamber, wherein hot smoke is processed. This process has the disadvantage that it can only be used with the casings of natural material, because these casings have permeability for smoke that is high enough.

Disadvantages are that the natural materials are expensive and cannot be produced in a constant quality. Therefore also the quality of the smoked foodstuff may show variations that are unacceptable.

Some attempts have been made to produce synthetic casings, not showing these disadvantages. It is very difficult to find suitable casings for this purpose, since the casing must have a high permeability for smoke and humidity at smoking temperatures, but it must on the other hand act as barrier for humidity at lower temperatures, to protect the foodstuff. Furthermore mechanical properties such as flexibility and tear strength have to be at an acceptable level under smoking conditions, under storage conditions at low temperatures and at ambient temperatures.

A first attempt to produce synthetic casings is reported in CA-1,235,018 wherein casings of nylon films are disclosed. Although it was possible to obtain smoked foodstuff packed in the casing, the casings have no satisfactory water vapor permeability. Furthermore it is difficult to produce the tubular film for the casing.

In WO204/098298 a synthetic casing is described produced from a polymer composition that contains many components. The mixing of the components is a complicated process. The composition contains a plasticizer resulting in risk of contamination of the foodstuff packed in the casing. The use of polyvinyl alcohol in the composition induces the risk on degradation products. Furthermore it is still difficult to produce a tubular film for the casing.

In U.S. Pat. No. 6,764,753 a synthetic casing is disclosed, produced from a film containing a mixture of nylon and thermoplastic copolyetherester elastomer. The casing shows a more acceptable permeability for the purpose of smoking foodstuff, however it is still difficult to produce the tubular film for the casing. This tubular film shows variations in both the wall thickness and the diameter of the tubular film, and often even a total collapse of the film may cause the production process to be interrupted. Therefore also these products were not accepted in industry.

Object of the invention is to provide a tubular film for foodstuff casings that does not show these disadvantages.

Surprisingly this object is achieved by providing a tubular film for foodstuff casings, which film is produced from a polymer composition containing a polar thermoplastic elastomer that has a complex shear viscosity $\eta^*$ of at least 3000 Pa·s measured according to ISO 6721-10:1999 at 240° C. and 0.1 rad/s.

The tubular film for the foodstuff casing according to the invention shows fewer variations in dimensions and also shows less interruption in its production process. Also stretching of the film, if required, is possible in a smooth production process, using standard equipment and conditions.

More preferably the complex shear viscosity $q^*$ of the thermoplastic polyester elastomer is at least 5000 Pa·s, more preferably 7500 Pa·s, even more preferably 10000 Pa·s measured according to ISO 6721-10:1999 at 240° C. and 0.1 rad/s.

The tubular film according to the invention is preferably produced from a polymer composition that contains A. 100-5 parts by weight of the polar thermoplastic elastomer and B. 0-95 parts by weight of one or more further thermoplastic polymers, where A and B add up to 100 parts by weight and 0-50 parts by weight based on 100 parts by weight of A and B of further additives.

More preferably the tubular film is produced from a composition containing A. 100-70 parts by weight of the polar thermoplastic elastomer and B. 0-30 parts by weight of one or more further thermoplastic polymers, where A and B add up to 100 parts by weight and 0-50, preferably 0-25, even more preferably 0-10 parts by weight of further additives. Such a film shows an increased permeability that is almost equal, or equal to casings of natural materials. Even more preferably such a tubular film is produced from a composition that contains A. 100-80 parts by weight of the polar thermoplastic elastomer and 0-20 parts by weight of one or more further thermoplastic polymers, yet even more preferably such a tubular film is produced from a composition that contains A. 100-90 parts by weight of the polar thermoplastic elastomer and 0-10 parts by weight of one or more further thermoplastic polymers. Most preferably the composition contains 100 parts by weight of the polar thermoplastic elastomer and no further polymers.

A. Polar Thermoplastic Elastomer

A thermoplastic elastomer is a rubbery material with the processing characteristics of a conventional thermoplastic and below its melting or softening temperature the performance properties of a conventional thermoset rubber. Thermoplastic elastomers are described in Handbook of Thermoplastic Elastomers, second edition, Van Nostrand Reinhold, New York (ISBN 0-442-29184-1).

The polar thermoplastic elastomer preferably contains oxygen (O) and/or nitrogen (N) atoms. Preferably the polar thermoplastic elastomer contains at least one N or one O atom at every 8 C atoms, preferably at every 6 C-atoms, more preferably at every 4 C atoms. In case the polar thermoplastic polymer contains both N and O atoms one polar atom calculated by summarizing the N and O atoms, at every 8, 6 or 4 C-atoms. Good examples of polar groups contained in the polar thermoplastic elastomer are —NH—, —O—, —COO—, and —CO—NH— groups.

Good examples of polar thermoplastic elastomers are polyester based thermoplastic elastomers, polyamide based thermoplastic elastomers and polyurethanes. Examples of polyester based thermoplastic elastomers include polyetherester elastomers, polyurethane ester elastomers, polycarbonate ester elastomers.

Preferably thermoplastic polyetherester elastomers are used.

The thermoplastic copolyetherester elastomer suitably contains hard segments that are built up from repeating units derived from at least one alkylene diol and at least one aromatic dicarboxylic acid or an ester thereof. As alternative to segment, also the term block is being used. The alkylene diol may be a linear or a cycloaliphatic alkylene diol. The linear or cycloaliphatic alkylene diol contains generally 2-6 C-atoms, preferably 2-4 C-atoms. Examples thereof include ethylene glycol, propylene diol and butylene diol. Preferably propylene diol or butylene diol are used, more preferably 1,4-butylene diol. Examples of suitable aromatic dicarboxylic acids include terephthalic acid, 2,6-naphthalenedicarboxylic acid, 4,4'-biphenyldicarboxylic acid or combinations of these. The advantage thereof is that the resulting polyester is generally semi-crystalline with a melting point of above 150, preferably above 175, and more preferably of above 190° C. The hard segments may optionally further contain a minor amount of units derived from other dicarboxylic acids, for example isophthalic acid, which generally lowers the melting point of the polyester. The amount of other dicarboxylic acids is preferably limited to not more than 10 mol %, more preferably not more than 5 mol %, so as to ensure that, among other things, the crystallization behaviour of the copolyetherester is not adversely affected. The hard segment is preferably built up from ethylene terephthalate, propylene terephthalate, and in particular from butylene terephthalate as repeating units. Advantages of these readily available units include favourable crystallisation behaviour and a high melting point, resulting in copolyetheresters with good processing properties, excellent thermal and chemical resistance and good puncture resistance.

Suitable aliphatic polyether soft segments in the thermoplastic copolyetherester elastomer are flexible polyethers that are substantially amorphous and have a glass-transition temperature ($T_g$) of below 0° C. Preferably, the $T_g$ is below −20° C., more preferably below −40, and most preferably below −50° C. The molar mass of the segments may vary within a wide range, but preferably the molar mass is chosen between 400 and 6000, more preferably between 500 and 4000, and most preferably between 750 and 3000 g/mol. Suitable aliphatic polyethers include a poly(alkylene oxide)diol derived from an alkylene oxide of 2-6 C-atoms, preferably 2-4 C-atoms, or combinations thereof. Examples include poly(ethylene oxide)diol, poly(tetramethylene oxide)diol or poly(tetrahydrofuran)diol, poly(neopentylene oxide-co-tetramethylene oxide)diol and poly(propylene oxide)diol. In one preferred embodiment the thermoplastic polyetherester elastomer contains as polyether segments ethylene oxide-terminated poly(propylene oxide)diol segments. A foodstuff casing of a film containing such a thermoplastic copolyether elastomer shows a good permeability for oxygen and carbon dioxide. This makes the casing suitable for packing food wherein after the packaging biological processes take place, for example biological processes for the preservation of the food, in for example meat sausages like salami. In another preferred embodiment the thermoplastic copolyetherester elastomer contains as polyether segments poly(ethylene oxide)diol segments, because in this way an optimal permeability during the smoking process is obtained. Such permeability is often expressed in terms of Water Vapour Transmission Rate (WVTR). A high WVTR is advantageously in high speed smoking also called short smoke processing, like for instance used in processing hot dogs.

Preferably the polar thermoplastic elastomer contains at least 50 wt. %, more preferably at least 55 wt. % even more preferably at least 60 wt. % of soft segments.

Good results are obtained if the thermoplastic copolyetherester elastomer contains chain branching agents. Suitable chain branching agents include e.g. trimellitic acid, trimellitic acid anhydride and trimethylol propane. The amount and type of chain extension or branching agent is chosen such that a block copolyester of desirable melt viscosity is obtained. In general, the amount of a chain branching agent will not be higher than 6.0 equivalents per 100 moles of dicarboxylic acids presenting the copolyetherester. The copolyetherester can further contain the usual catalysts and stabilisers.

Examples and preparation of copolyetheresters are for example described in Handbook of Thermoplastics, ed. O. Olabishi, Chapter 17, Marcel Dekker Inc., New York 1997, ISBN 0-8247-9797-3, in Thermoplastic Elastomers, 2nd Ed, Chapter 8, Carl Hanser Verlag (1996), ISBN 1-56990-205-4, in Encyclopedia of Polymer Science and Engineering, Vol. 12, Wiley & Sons, New York (1988), ISBN 0-471-80944, p. 75-117, and the references cited therein.

Particularly preferred is a copolyetherester with hard segments built up from butylene terephthalate units and soft segments derived from ethylene oxide-terminated poly(propylene oxide)diol.

Most preferably the copolyetherester elastomer has been subjected to a post condensation process. Post condensation of the elastomer is a suitable and economic way of obtaining a high molecular weight, resulting in an elastomer having the desired viscosity, necessary for obtaining the good processability of the composition, to obtain the tubular film according to the invention. Most suitable is solid state post condensation. In this process the solid copolyetherester elastomer is heated to about 10-20° C. below its melting point in a tumble dryer. A vacuum is applied to remove condensation products from the elastomer.

B. One or More Further Polymers

Good examples of the further polymers that may be used in the polymer composition from which the tubular film according to the invention is produced are aliphatic polyamides, like for example polyamide 6, polyamide 6.66, polyamide 6.66.9, polyamide 6.66.12, polyamide 6.9, polyamide 6.10, polyamide 4.6, polyamide 11, polyamide 12, polyamide 6.12 etc. and blends thereof. Further polyamides are given in U.S. Pat. No. 6,764,753.

C. Further Additives

Further additives may include antioxidants, dyes or pigments, UV absorbers, hydrolytic stabilizers, anti-static agents, fillers, lubricants etc. Examples of fillers include cellulose powder and polysaccharide powder, like corn starch powder. The polymeric compositions contains preferably less than 25 parts, more preferably less than 15 further additives at 100 parts A and B.

The tubular film may be produced by techniques that are known for the production of tubular films for casings of synthetic materials, such as plastics. Examples of such process are given in U.S. Pat. No. 3,278,663; U.S. Pat. No. 3,337,665; U.S. Pat. No. 4,590,106; U.S. Pat. No. 4,769,421; U.S. Pat. No. 4,797,235; U.S. Pat. No. 4,886,634.

One possible technique is to produce a tubular film by a film blowing process, using an annular die, cooling down the film and thereafter stretching it biaxial at a temperature below its melting point in a calibration apparatus. This technique is also referred to as the double bubble process.

Another possibility is to produce a film by a film blowing process from an annular die, wherein a film is produced that has about the diameter of the annular die. These essentially unstretched tubular films are used for sausage casings.

Good results are obtained if the tubular film according to the invention is subjected to electron beam radiation, to create chemical cross-linking. In this way a film is obtained that is highly elastic, also at high filling temperatures. This ensures a smooth surface, without any wrinkles, of the foodstuff casing after filling and processing. It also ensures a rapid filling process, without the casing being stretched. Because of the stretching the filling volume of the casing becomes undetermined, or it is even possible that the casing breaks.

Instead of applying e-beam treatment it is also possible to pre-stretch the tubular film according to the invention to a extend high enough to obtain a film having sufficient elasticity. Such pre-stretching may for example be carried out by the double bubble process or by biaxial stretching of cast film which is welded into a tubular film subsequently. Preferably the film is pre-stretched with a stretching ratio high enough that the film has an elastic strain of at least 5%, more preferable at least 10%.

The process of electron beam radiation or the process of pre-stretching are preferably applied on tubular films produced from a composition containing A. 100-70 parts by weight of the polar thermoplastic elastomer and B. 0-30 parts by weight of one or more further thermoplastic polymers, where A and B add up to 100 parts by weight and 0-50, preferably 0-25, even more preferably 0-10 parts by weight of further additives. Such a film shows an increased permeability as said before, but it also shows increased sensitivity to stretching during the filling process. Even more preferably the e-beam process or the process of pre-stretching are applied to a tubular film produced from a composition that contains A. 100-80 parts by weight of the polar thermoplastic elastomer and 0-20 parts by weight of one or more further thermoplastic polymers, yet even more preferably the e-beam process or the process of pre-stretching are applied to a tubular film produced from a composition that contains A. 100-90 parts by weight of the polar thermoplastic elastomer and 0-10 parts by weight of one or more further thermoplastic polymers. Most preferably the composition contains 100 parts by weight of the polar thermoplastic elastomer and no further polymers.

The invention also relates to a foodstuff casing produced from the tubular film according to the invention.

The invention also relates to the use of a foodstuff casing according to the invention for packing of meat sausages, hot dogs and cheese.

The invention also relates to a foodstuff casing according to the invention containing a smoked food product, preferably a smoked sausage.

The invention also relates to a foodstuff casing according to the invention containing a fermented food product, preferably salami.

Smoking of the food products may take place in a smoke chamber, the smoke in the chamber being produced by burning of woods.

The foodstuff casing according to the invention is very suitable to be used in a smoking process using so-called liquid smoke. In such a process a solution containing smoke flavours is applied into the film of the casing prior to filling the casing with meat. During the processing of the sausage the flavours will be transferred to the meat giving the meat a smoky taste.

EXAMPLES

Preparation of Copolyetheresters

COPE 1: Copolyetherester 1 was prepared out of 65 weight percent 1,4-butylene terephthalate and 35 weight percent of polyethylene glycol by melt polymerisation until the torque of the reactor reached its processing limit. The reactor was let down and the copolyetherester strand coming from the reactor was cooled and granulated. The granules where subsequently filled into a tumble dryer and heated to a granulate temperature of 175° C. while the tumble dryer was kept under vacuum. The solid state post condensation process was stopped when the melt flow rate (MFR at 230° C./2.16 Kg) of the polymer reacted is 1.5 grams/10 minutes. This process took approximately 30 hours.

COPE 2: copolyetherester 2 prepared out of 65 weight percent 1,4-butylene terephthalate and 35 weight percent of polyethylene glycol by melt polymerisation until the torque of the reactor reached its processing limit. The reactor was let down and the copolyetherester strand coming from the reactor was cooled and granulated. The granules where subsequently filled into a tumble dryer and heated to a granulate temperature of 175° C. while the tumble dryer was vacumated. The solid state post condensation process was stopped when the melt flow rate (MFR at 230° C./2.16 Kg) of the polymer reacted is 5 g/10 min. This process took approximately 23 hours.

COPE 3: Copolyetherester 3 was prepared out of 65 weight percent 1,4-butylene terephthalate and 35 weight percent of polyethylene glycol by melt polymerisation until the torque of the reactor reached its processing limit. The reactor was let down and the copolyetherester strand coming from the reactor was cooled and granulated. The granules where subsequently filled into a tumble dryer and heated to a granulate temperature of 175° C. while the tumble dryer was evacuated. The solid state post condensation process was stopped when the melt flow rate (MFR at 230° C./2.16 Kg) of the polymer reacted is 10 g/10 min. This process took approximately 18 hours.

Finally the complex shear viscosity $\eta^*$ of the copolyetheresters was measured according to ISO 6721-10:1999 at 240° C. and 0.1 rad/s. For the measurements an Ares LS plate-plate rheometer was used. The materials were dried during 4 hours at 100° C. prior to the measurement was under a nitrogen atmosphere. After filling and closing the rheometer measurements were started after a retention time of 5 minutes. The results are as reported in table 1.

TABLE 1

| Frequency rad/s | Elastomer 1 Pa · S | Elastomer 2 Pa · S | Elastomer 3 Pa · S |
| --- | --- | --- | --- |
| 0.1 | 46369 | 3986 | 1536 |

Polyamide 1: polyamide 6 commercially available under the trade name Akulon F136 from DSM, having a viscosity of 245 g/cm$^3$ measured according to IS0307

Polyamide 2: polyamide 6.6 commercially available under the trade name Akulon S240C from DSM, having a viscosity of 280 g/cm$^3$ measured according to IS0307

Example 1-6

Comparative Experiments A, B and C

Compositions according to the invention (examples 1-6) and known compositions (experiments A, B and C) were blended together as a dry blend and from these blends it was tried to prepare a tubular film according to the double bubble process. Processing temperature was set at 250° C. The formulations in Table 2 are given in part per weight relative to the total weight of the composition. It was impossible to produce a tubular film from the compositions according to experiments A, B and C, at acceptable processing speeds, because of continuous interruptions in the blow moulding process of the tubular film. Better results were obtained with the compositions according to examples 4-6. Only very occasionally interruptions occurred at high processing speeds. Best results were obtained with the compositions of examples 1-3. No interruptions occurred, even not at very high processing speeds. The tubular film obtained in these examples also showed a homogeneous wall thickness.

TABLE 2

| Example/exp. | 1 | 2 | 3 | 4 | 5 | 6 | A | B | C |
|---|---|---|---|---|---|---|---|---|---|
| COPE 1 | 20 | 30 | 40 | | | | | | |
| COPE 2 | | | | 20 | 30 | 40 | | | |
| COPE 3 | | | | | | | 20 | 30 | 40 |
| Polyamide 1 | 80 | 70 | 60 | 80 | 70 | 60 | 80 | 70 | 60 |
| Processability | Good | good | Good | fair | fair | Fair | impossible | impossible | impossible |

Examples 7-12

And Comparative Experiments D, E and F

Compositions according to the invention (examples 7-12) and known compositions (experiments D, E and F) were blended together as a dry blend and from these blends it was tried to prepare a tubular film according to the unstretched film blowing process. Processing temperature was set at 280° C. The formulations in Table 3 are given in part per weight relative to the total weight of the composition.

TABLE 3

| Composition | 7 | 8 | 9 | 10 | 11 | 12 | D | E | F |
|---|---|---|---|---|---|---|---|---|---|
| COPE 1 | 20 | 30 | 40 | | | | | | |
| COPE 2 | | | | 20 | 30 | 40 | | | |
| COPE 3 | | | | | | | 20 | 30 | 40 |
| Polyamide 2 | 80 | 70 | 60 | 80 | 70 | 60 | 80 | 70 | 60 |
| Processability | good | good | good | fair | fair | fair | impossible | impossible | impossible |

The results as shown in table 2 were confirmed.

The invention claimed is:

1. A tubular film for foodstuff casings, which film is produced from a polymer composition containing a polar thermoplastic elastomer that has a complex shear viscosity η* of at least 3000 Pa·s measured according to ISO 6721-10:1999 at 240° C. and 0.1 rad/s.

2. A tubular film according to claim 1, wherein the polar thermoplastic elastomer has a complex shear viscosity η* of at least 5000 Pa·s measured according to ISO 6721-10:1999 at 240° C. and 0.1 rad/s.

3. A tubular film according to claim 1, wherein the polymer composition contains:
   A. 100-70 parts by weight of the polar thermoplastic elastomer
   B. 0-30 parts by weight of one or more further thermoplastic polymers, where A and B add up to 100 parts by weight and
   0-50 parts by weight based on 100 parts by weight of A and B of further additives.

4. A tubular film according to claim 1, wherein the polar thermoplastic elastomer contains branching agents.

5. A tubular film according to claim 1, wherein the thermoplastic copolyetherester elastomer has been subjected to a post-condensation process.

6. Foodstuff casing produced from the tubular film according claim 1.

7. A tubular film according to claim 1, wherein the polar thermoplastic elastomer contains O and or N atoms.

8. A tubular film according to claim 7, wherein the polar thermoplastic elastomer contains at least one N or one O atom at every 8 C atoms.

9. A tubular film according to claim 1, wherein the polar thermoplastic elastomer is a thermoplastic copolyetherester elastomer.

10. A tubular film according to claim 9, wherein the thermoplastic copolyetherester elastomer contains as polyether segments poly(ethylene oxide)diol segments.

* * * * *